Oct. 3, 1944.   R. LEONARD ET AL   2,359,525
APPARATUS FOR BUTT WELDING RODS
Filed Dec. 14, 1942   2 Sheets-Sheet 1
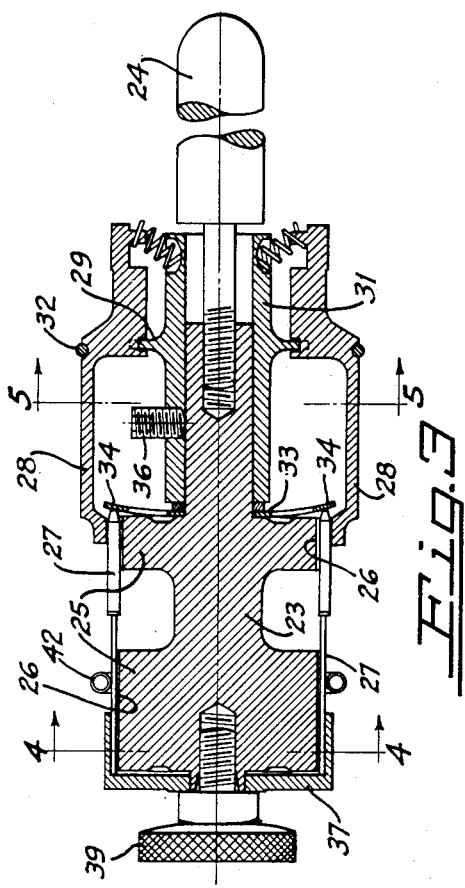
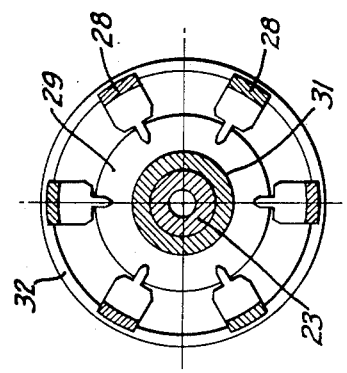
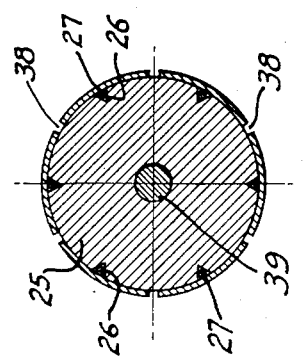
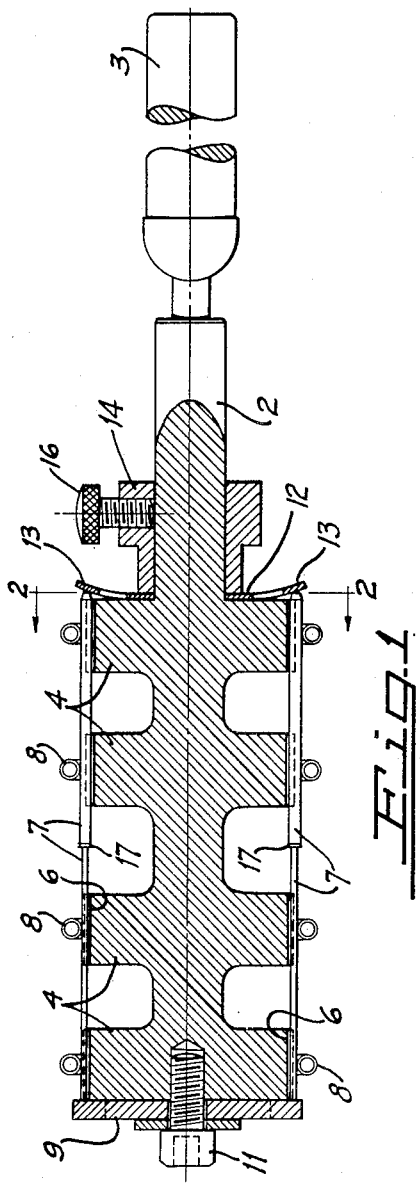
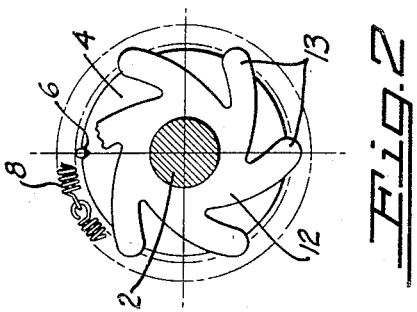
INVENTORS
RADFORD LEONARD
FRANCIS MIGGE
BY
THEIR ATTORNEY Oct. 3, 1944.  R. LEONARD ET AL  2,359,525
APPARATUS FOR BUTT WELDING RODS
Filed Dec. 14, 1942   2 Sheets-Sheet 2
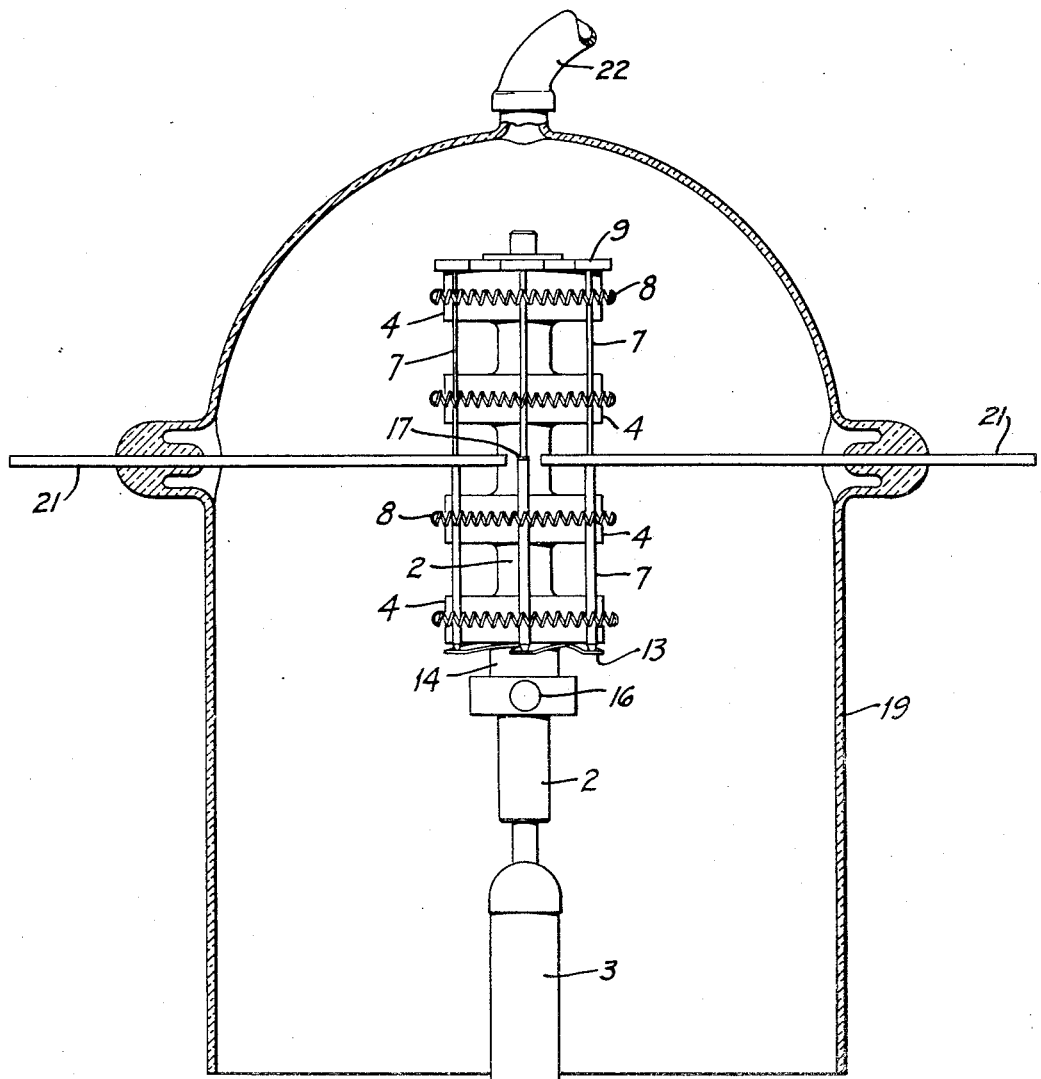
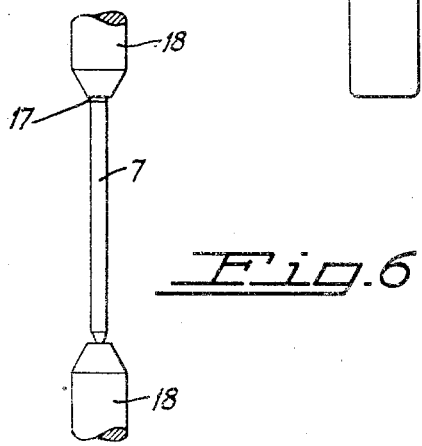
INVENTORS
RADFORD LEONARD
FRANCIS MIGGE
BY
THEIR ATTORNEY Patented Oct. 3, 1944

2,359,525

UNITED STATES PATENT OFFICE 2,359,525

APPARATUS FOR BUTT WELDING RODS

Radford Leonard and Francis Migge, San Bruno, Calif., assignors to Eitel-McCullough, Inc., San Bruno, Calif., a corporation of California Application December 14, 1942, Serial No. 468,990

5 Claims. (Cl. 113—99)

This application is particularly directed to the apparatus embodying our invention. Claims drawn to the method appear in our copending application Serial No. 502,370, filed September 14, 1943.

Our invention relates to butt welding metallic rods, and particularly to welding together rods of a refractory metal, such as tungsten, adaptable for use as a lead in electronic tubes.

It is among the objects of our invention to provide apparatus for producing a superior welded joint between metallic rods of the character described.

Another object is to provide improved jig for holding the rods during welding.

The invention possesses other objects and features of advantage, some of which, with the foregoing, will be set forth in the following decription of our invention. It is to be understood that we do not limit ourselves to this disclosure of species of our invention as we may adopt variant embodiments thereof within the scope of the claims.

Referring to the drawings:

Figure 1 is a side view, partially in section and partially in elevation, showing our jig; and Figure 2 is a cross-sectional view of the same taken in a plane indicated by line 2—2 of Figure 1.

Figure 3 is a view similar to Figure 1, illustrating a modified jig; and

Figures 4 and 5 are cross-sectional views of the same taken in planes indicated by lines 4—4 and 5—5 respectively of Figure 3.

Figure 6 is a side elevational view showing means for spot welding the nickel flux to one of the tungsten rods.

Figure 7 is a vertical sectional view through a bell jar illustrating the jig in position for welding.

In terms of broad inclusion, our method of butt welding metallic rods comprises bringing the rods into abutment under pressure with a piece of metallic flux interposed therebetween, and subjecting the joint to welding heat in an atmosphere devoid of oxygen. For tungsten rods the flux is preferably nickel; the flux being preferably spot welded to an end of one of the rods prior to bringing the latter into abutment for the final weld. Our improved jig comprises a frame having spaced supports thereon; means associated with the supports for holding the rods in axial alignment with their opposing ends lying in the space between the supports; and means on the frame for pressing the rods into abutment. The jig is preferably designed to hold a plurality of pairs of rods ready for welding. A handle on the jig enables the latter to be elevated into a bell jar containing the desired atmosphere and source of welding heat.

In greater detail, and referring to Figures 1 and 2 of the drawings, our jig comprises a frame having a central stem 2 terminating in an elongated handle 3. The stem carries a plurality of say four spaced cylindrical supports 4 having aligned grooves 6 circumferentially disposed about the peripheries thereof. A plurality of say six pairs of rods 7 to be welded are held in alignment by the grooves on the supports with opposing ends of the rods disposed in a circle lying in the open space between the supports. The rods may be of the same or different diameter. If different, the grooves are sized accordingly to keep the leads coaxially aligned. Grooves 6 are preferably V-shaped.

Means associated with the supports are provided for holding rods 7 in the grooves. For this purpose coiled spring bands 8 are preferably disposed about the rods on the supports. These bands hold the rods firmly and withstand the heat accompanying the welding operation.

A plate 9 secured to the outer support by screw 11 has peripheral portions overlying the ends of the grooves to provide fixed stops against which the rods may bear. This limits outward movement of the rods in an axial direction.

Means are also provided for pressing the rods into abutment and maintaining pressure between the opposing ends thereof during welding. To do this a plate 12 having resilient arms 13 is interposed between the inner ends of the rods and a sleeve 14 slidable on stem 2, the sleeve being held in a selected position by a set screw 16. Arms 13 provide resilient stops for the ends of the rods and function to simultaneously urge the rods into axial abutment. In assembling the rods on the jig, sleeve 14 may be set in final position and the rods individually pressed down against the resilient arms 13; or sleeve 14 may be backed off and, after all the rods have been positioned, the sleeve then brought up to move plate 12 against the rod ends.

When tungsten rods are to be butt welded together a piece 17 of nickel is preferably first spot welded to an end of one of the rods in each pair. Figure 6 shows a rod between welding electrodes 18 for spot welding piece 17 in place, the electrodes 18 being mounted in a suitable spot welding machine. When subsequently assembled in the jig this nickel piece lies between the opposing ends of rods 7.

The jig is then elevated into a bell jar 19 having electrodes 21 arranged and suitably energized to form an electric arc therebetween. The bell jar contains an atmosphere devoid of oxygen, a hydrogen atmosphere being preferred, supplied through duct 22. In making the welds the operator brings the ends of a pair of rods into the arc, then backs up the jig, turns it, and brings the ends of another pair of rods into the arc. This procedure is repeated until all joints have been welded. Since the joints all lie in the open space between supports 4 the abutting rods may be readily moved into and out of the arc between electrodes 21.

Welding with our improved jig is quite fast because a plurality of say six or more pairs of rods may be welded with one setup of the jig. Another feature is that the rods are held in perfect alignment. This is particularly important in butt welding tungsten rods for use as leads in electronic tubes, wherein a lead portion is welded to another of larger diameter. We have found that the nickel 17 alloys or fluxes with the tungsten in the heat of an electric arc, producing a strong and tightly knitted weld. Making the weld in the absence of oxygen provides a clean joint, free of oxides, which is important in leads for an electronic tube.

Figures 3 to 5 show a modified jig structure particularly adapted for butt welding rods of shorter length. In this case the frame comprises a stem 23 terminating in a handle 24 and carrying a single pair of spaced supports 25 having aligned grooves 26 for receiving the pairs of rods 27. The inner rods are held by spring pressed levers 28 fulcrumed on a flange 29 of sleeve 31 and retained by a ring 32 disposed about the circumferentially spaced set of levers.

Axial pressure is maintained at the inner ends of the rods by a plate 33 having resilient arms 34. This plate is interposed between the inner support 25 and sleeve 31, the latter being secured to stem 23 by a set screw 36.

The outer rods are held in their respective grooves by a cup-shaped cap 37 turnably mounted on the end of the outer support 24. Cap 37 has a series of slots 38 adapted to register with grooves 26 for purposes of inserting the rods. After insertion the cap is turned to lock the rods in place, the end of the cap functioning as a stop for the outer ends of the rods. Cap 37 is also mounted for axial movement on support 25, and is moved inwardly against the ends of the rods by a screw 39. This furnishes means for simultaneously shifting the aligned rods into pressure engagement with resilient arms 34. If desired, additional holding means for the rods on the outer support may be provided, as by a coiled spring band 42 disposed about the rods adjacent cap 37.

Instead of an arc, the source of welding heat in the bell jar may be a burning filament suitably shaped and positioned to permit moving the abutting ends of the rods into proximity to the heat zone. The arc is preferred however because the heat zone is more confined and the heat is more or less restricted to the region at the joint to be welded.

We claim:

1. A jig for butt welding metallic rods, comprising a frame having spaced supports thereon, means associated with the supports for slidably holding the rods in axial alignment with their opposing ends lying in the space between the supports, and resilient means on the frame for pressing the rods into abutment.

2. A jig for butt welding metallic rods, comprising a frame having spaced supports thereon, means associated with the supports for holding a plurality of pairs of rods in axial alignment with opposing ends of the rods lying in the space between the supports, and resilient means on the frame engageable with an end of a rod in each pair for pressing the rods into abutment.

3. A jig for butt welding metallic rods, comprising a frame having spaced cylindrical supports thereon, and means associated with the supports for holding a plurality of pairs of the rods in axial alignment with opposing ends of the rods disposed in a circle lying in the space between the supports.

4. A jig for butt welding metallic rods, comprising a frame having spaced supports thereon, means associated with the supports for holding the rods in axial alignment with their opposing ends lying in the space between the supports, a resilient stop on the frame engageable with one of the rods, and means for effecting relative movement between the rods and said stop for pressing the opposing ends of the rods together.

5. A jig for butt welding metallic rods, comprising a frame having spaced supports thereon, means associated with the supports for holding a plurality of pairs of rods in axial alignment with opposing ends of the rods lying in the space between the supports, resilient stops on the frame engageable with a rod of each pair, and means for simultaneously effecting relative movement between the rods and said stops for pressing the opposing ends of the rods together.

RADFORD LEONARD.
FRANCIS MIGGE.